United States Patent
Kole et al.

(10) Patent No.: US 9,787,342 B2
(45) Date of Patent: Oct. 10, 2017

(54) SUBSCRIBER IDENTITY MODULE (SIM) EJECTOR

(71) Applicant: Apple Inc., Cupertino, CA (US)

(72) Inventors: Jared M. Kole, San Francisco, CA (US); Shayan Malek, San Jose, CA (US); Matthew D. Hill, Santa Clara, CA (US); Michael Benjamin Wittenberg, Sunnyvale, CA (US); Gregory N. Stephens, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 14/552,295

(22) Filed: Nov. 24, 2014

(65) Prior Publication Data

US 2016/0073529 A1    Mar. 10, 2016

Related U.S. Application Data

(63) Continuation of application No. PCT/US2014/067048, filed on Nov. 24, 2014.

(60) Provisional application No. 62/046,799, filed on Sep. 5, 2014.

(51) Int. Cl.
*H01R 13/62* (2006.01)
*H04B 1/3816* (2015.01)
*H04M 1/02* (2006.01)

(52) U.S. Cl.
CPC .......... *H04B 1/3816* (2013.01); *H04M 1/026* (2013.01)

(58) Field of Classification Search
CPC .......................... H01R 13/633; H01R 13/6353
USPC ........................................ 439/159, 160, 630
See application file for complete search history.

(56) References Cited

U.S. PATENT DOCUMENTS

| 5,740,012 | A | * | 4/1998 | Choi | G06F 1/1616 |
| | | | | | 361/679.39 |
| 6,030,238 | A | * | 2/2000 | Dong | G06K 13/08 |
| | | | | | 439/159 |
| 6,074,226 | A | * | 6/2000 | Futatsugi | G06K 7/0047 |
| | | | | | 439/152 |
| 6,210,188 | B1 | * | 4/2001 | Chang | G06K 13/08 |
| | | | | | 439/159 |
| 6,224,405 | B1 | * | 5/2001 | Eland | H01R 13/62966 |
| | | | | | 439/152 |
| 6,406,309 | B1 | * | 6/2002 | Ennis | H01R 13/6335 |
| | | | | | 439/152 |

(Continued)

FOREIGN PATENT DOCUMENTS

WO    WO9809249    3/1998

OTHER PUBLICATIONS

PCT Application No. PCT/US2014/067048—International Search Report and Written Opinion dated May 28, 2015.

*Primary Examiner* — Abdullah Riyami
*Assistant Examiner* — Thang Nguyen
(74) *Attorney, Agent, or Firm* — Downey Brand LLP

(57) ABSTRACT

Several embodiments for ejecting a SIM tray from an electronic device are disclosed. In some embodiments, a lever positioned behind the tray can be actuated to eject the tray. In some embodiments, a pivot mechanism can be actuated to eject the tray. In other embodiments, a gear mechanism can be actuated to eject the tray. In other embodiments, a spring element can be actuated to eject the tray. In some embodiments, the electronic device may include a key feature that allows the tray to eject only when a tool is used having a mating key feature with the key feature of the electronic device.

18 Claims, 9 Drawing Sheets

(56) References Cited

U.S. PATENT DOCUMENTS

| | | | | |
|---|---|---|---|---|
| 6,705,890 B2* | 3/2004 | Kitou | ............. | H01R 13/72 439/160 |
| 6,814,597 B1* | 11/2004 | Kao | ............. | H01R 13/633 439/155 |
| 8,337,223 B2* | 12/2012 | Gao | ............. | G06K 13/0856 439/159 |
| 8,462,514 B2* | 6/2013 | Myers | ............. | G06K 13/08 361/754 |
| 8,591,240 B2* | 11/2013 | Jenks | ............. | G11B 17/00 439/159 |
| 8,605,451 B2* | 12/2013 | Tang | ............. | H04B 1/3816 361/679.31 |
| 8,614,897 B2* | 12/2013 | Tang | ............. | G06K 13/08 361/752 |
| 8,767,381 B2* | 7/2014 | Shukla | ............. | G06F 1/1658 361/679.01 |
| 8,777,669 B2* | 7/2014 | Hu | ............. | H01R 12/714 439/159 |
| 8,960,818 B2* | 2/2015 | Myers | ............. | 312/319.2 |
| 9,083,438 B2* | 7/2015 | Tsai | ............. | G06K 7/0069 |
| 9,164,539 B2* | 10/2015 | Wu | ............. | G06F 1/1613 |
| 9,311,571 B2* | 4/2016 | Lei | ............. | G06K 13/0831 |
| 2001/0055897 A1* | 12/2001 | Nogami | ............. | G06K 13/0825 439/159 |
| 2002/0048979 A1* | 4/2002 | Kodama | ............. | G06K 13/08 439/159 |
| 2004/0009690 A1* | 1/2004 | Natori | ............. | G06K 13/0806 439/152 |
| 2004/0253858 A1* | 12/2004 | Obara | ............. | H01R 13/629 439/152 |
| 2005/0221853 A1 | 10/2005 | Silvester | | |
| 2006/0223350 A1* | 10/2006 | Matsunaga | ............. | H01R 12/7005 439/152 |
| 2010/0203929 A1 | 8/2010 | Skagmo et al. | | |
| 2012/0195013 A1* | 8/2012 | Trzaskos | ............. | G06K 13/0831 361/754 |
| 2014/0154903 A1* | 6/2014 | Wang | ............. | G06K 7/00 439/152 |

* cited by examiner

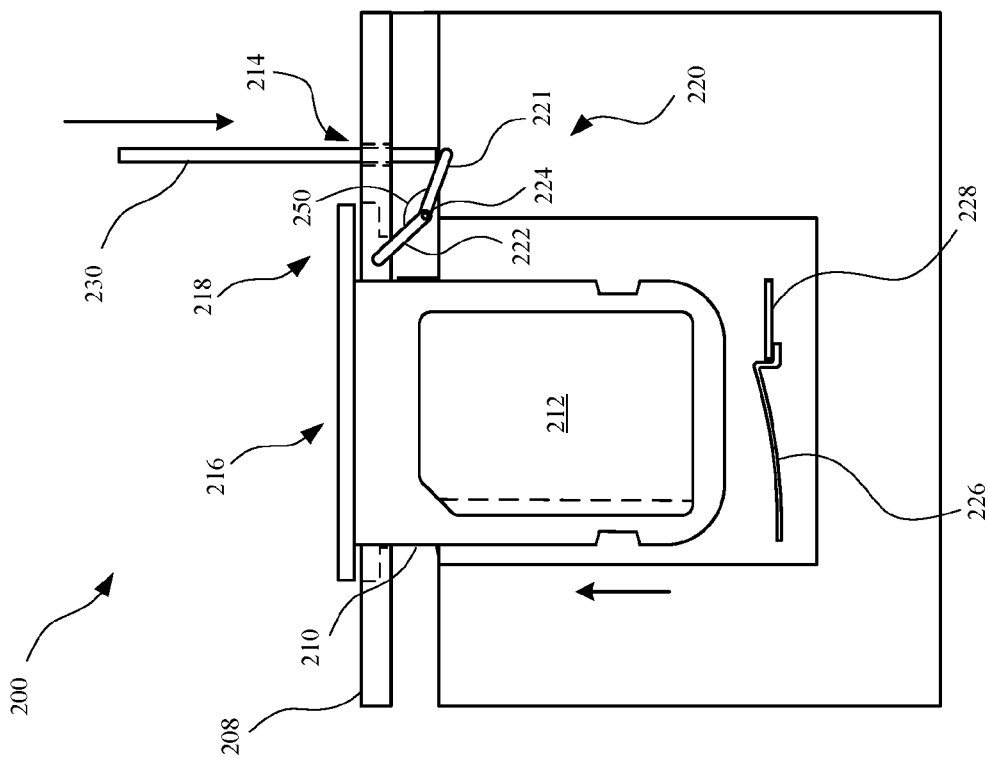
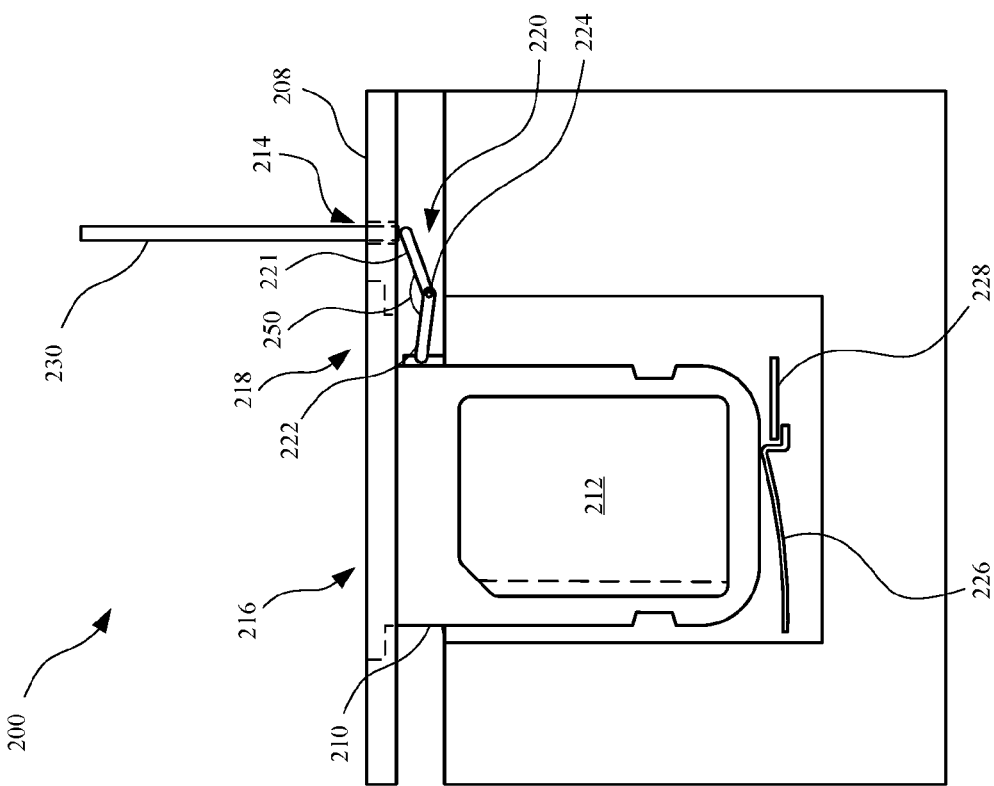

SUBSCRIBER IDENTITY MODULE (SIM) EJECTOR

CROSS-REFERENCE TO RELATED APPLICATION(S)

This is a continuation of International Application PCT/US14/67048, with an international filing date of Nov. 24, 2014, entitled "Subscriber Identity Module (SIM) Ejector", which claims the benefit of priority under 35 U.S.C §119(e) to U.S. Provisional Application No. 62/046,799, filed on Sep. 5, 2014, the disclosure of which is incorporated herein by reference in its entirety.

FIELD

The described embodiments relate generally to electronic devices. In particular, the present embodiments relate to ejection methods of a component within an electronic device.

BACKGROUND

Subscriber identity module ("SIM") cards are integrated circuits commonly used in electronic devices. SIM cards are commonly used to store identification and/or authentication information related to a user of the electronic device. In some cases, SIM cards may be removed from the electronic device.

However, as electronic devices decrease in size, the mechanisms used to remove the SIM card may no longer comply with the decreased size. Particularly, mechanisms directly above or below the SIM card may no longer be used.

SUMMARY

In one aspect, an ejector apparatus suitable for use in an electronic device for ejecting an object from the electronic device is described. The ejector apparatus may include an arm mechanism. The arm mechanism may include a first arm. The arm mechanism may further include a second arm pivotably coupled to the first arm at a fulcrum. In some embodiments, the first arm rotates about the fulcrum in response to a force causing the second arm to rotate about the fulcrum to engage a front portion of the object and at least partially eject the front portion from a sidewall of the electronic device.

In another aspect an ejector apparatus suitable for use in an electronic device for ejecting a tray from the electronic device is described. The ejector apparatus may include a first pivot mechanism proximate to a front portion of the tray. The ejector apparatus may further include a second pivot mechanism proximate to the front portion of the tray. The ejector apparatus may further include an axle secured to the first pivot mechanism and the second pivot mechanism. In some embodiments, the first pivot mechanism and the axle rotate in response to a force applied to the first pivot mechanism causing the second pivot mechanism to rotate causing the first pivot mechanism and the second pivot mechanism to engage a front portion of the tray to eject the front portion.

In another aspect, an ejector apparatus suitable for use in an electronic device for ejecting an object from the electronic device is described. The ejector apparatus may include an arm mechanism proximate to a front portion of the object, the front portion co-planar with respect to a sidewall of the electronic device. The ejector apparatus may further include a fulcrum coupled to the arm mechanism. In some embodiments, when the arm mechanism engages the front portion to eject the object in response to a force applied via an aperture in the electronic device.

In another aspect, an electronic device is described. The electronic device may include a tray. The electronic device may further include an integrated circuit positioned at least partially within the tray. The electronic device may further include a mechanism. In some embodiments, when the mechanism is actuated, the tray is at least partially ejected from the electronic device.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 5 illustrates a plan view of an embodiment of an electronic device having a pivot mechanism configured to release a tray;

FIG. 6 illustrates a plan view of the embodiment shown in FIG. 5, showing a tool actuating the pivot mechanism to release the tray;

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to various techniques for ejecting a tray carrying a subscriber identity module ("SIM") card from an electronic device. In some cases, a mechanism may be positioned in a rear portion of the tray. When a tool is inserted into the electronic device through an opening (of the electronic device), the tool can actuate the mechanism which in turn exerts a force on the tray and ejects the tray. The mechanism may be selected from, for example, a lever, a pivot mechanism, or a gear mechanism. The mechanism may be positioned in different locations of the electronic device. In some embodiments, the electronic device further includes a lock feature that prevents the mechanism from actuation. In this manner, the mechanism can be actuated only when a key (or other mating device) with a corresponding mating feature is inserted into the lock feature to unlock the lock feature. Also, in some embodiments, an aperture used to receive a tool may be in a location other than the tray, such as a sidewall of an enclosure of the electronic device. In that case, the tray may not include an aperture for receiving a tool.

These and other embodiments are discussed below with reference to FIGS. 1-18. However, those skilled in the art will readily appreciate that the detailed description given herein with respect to these Figures is for explanatory purposes only and should not be construed as limiting.

Figure 1:
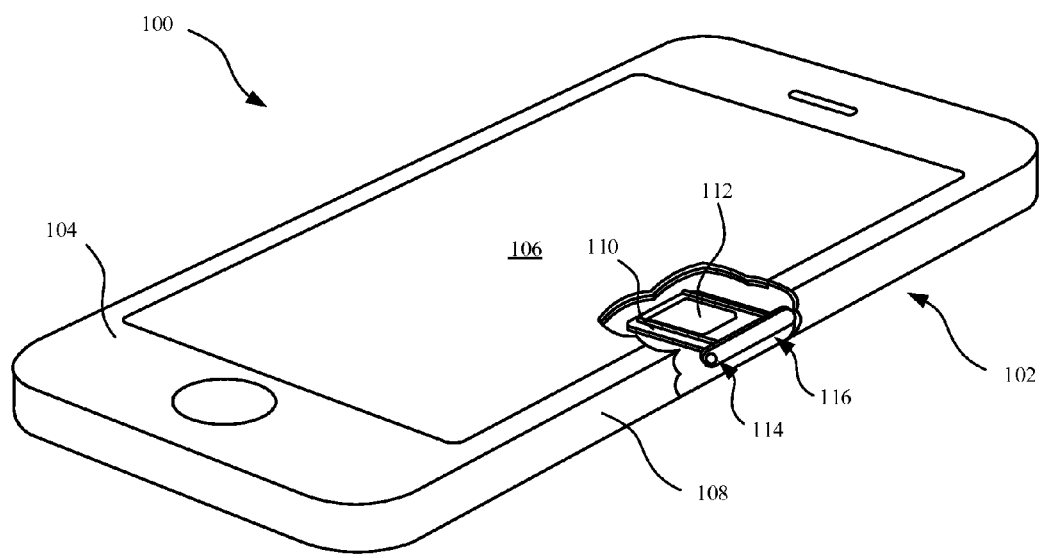
FIG. 1 illustrates an isometric view of an electronic device with a partial cross sectional view of a tray carrying an integrated circuit.

FIG. 1 illustrates an embodiment of electronic device 100, or simply device 100. In some embodiments, device 100 is a mobile telecommunications device, such as an iPhone® from Apple, Inc., of Cupertino, Calif. In some embodiments, device 100 is a tablet computing device, such as an iPad® from Apple, Inc., of Cupertino, Calif. Device 100 may include enclosure 102 that receives cover glass 104. In some embodiments, enclosure 102 is formed from a metal material, such as aluminum or an aluminum alloy. Also, display panel 106 may be positioned between cover glass 104 and enclosure 102. Display panel 106 may be configured to transmit visual display content that may be viewed by a user. Also, enclosure 102 may include several sidewalls, including sidewall 108.

FIG. 1 further shows a partial cross sectional view device 100 having tray 110. Tray 110 may be made from rigid polymeric materials, such as plastic. In other embodiments, tray 110 includes front portion 116 (or front fascia) made from a material similar to that of enclosure 102 to provide a consistent appearance with enclosure 102. Also, in some embodiments, tray 110 is configured to carry integrated circuit 112. In some embodiments, integrated circuit 112 is a SIM card configured to carry identification and/or authentication information related to a user of device 100. Tray 110 may further include aperture 114 that may receive a tool (not shown) used to remove or eject tray 110 (and integrated circuit 112) from device 100.

Figure 2:
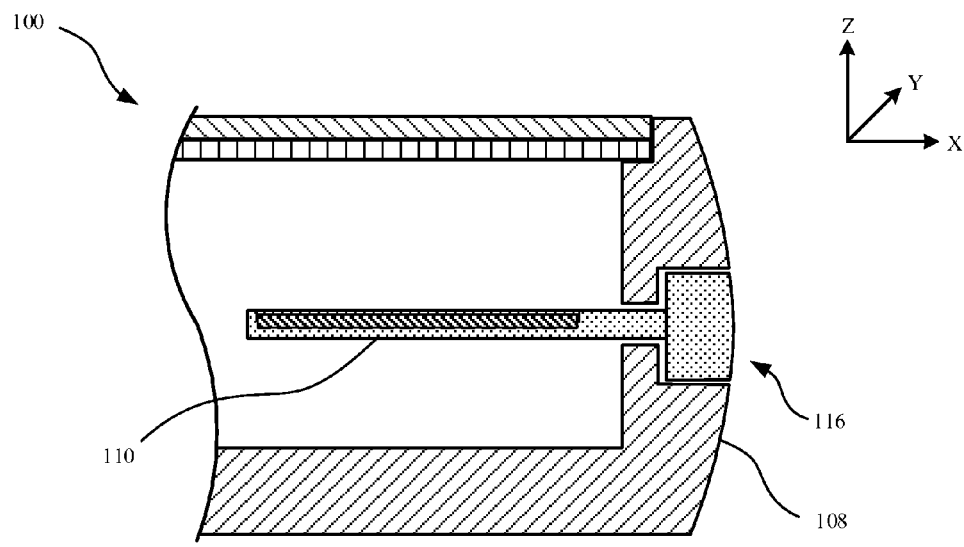
FIG. 2 illustrates a cross sectional view of the electronic device and the tray shown in FIG. 1.

FIG. 2 illustrates a cross sectional view of device 100 and tray 110 shown in FIG. 1. For illustrative purposes, some components are not shown. As shown, front portion of tray 110 may be substantially co-planar, or flush, with respect to an outer fascia of sidewall 108.

Figure 3:
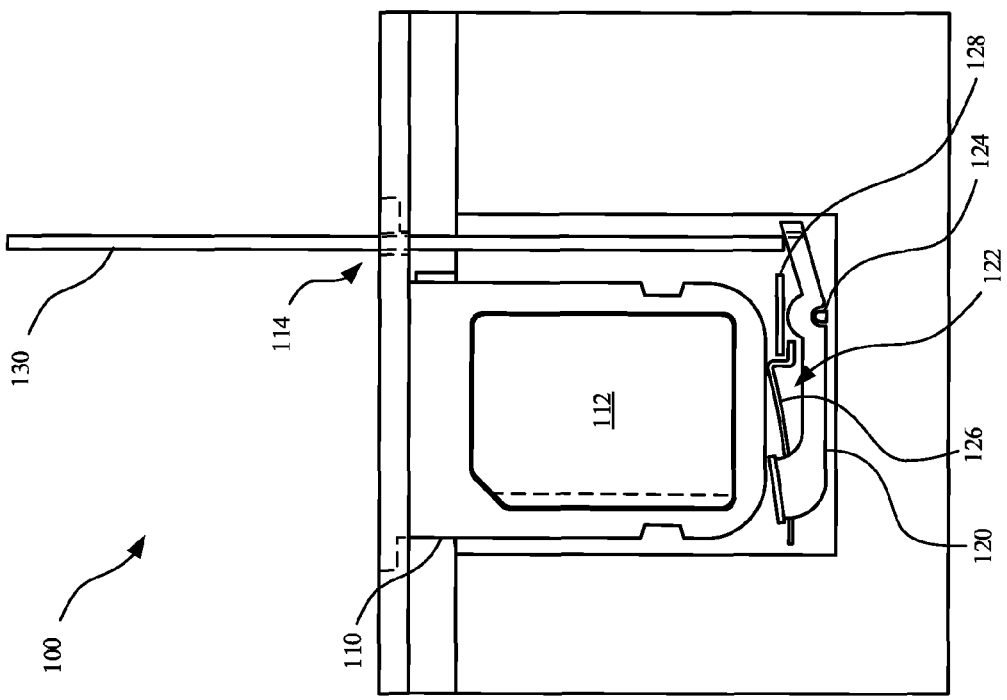
FIG. 3 illustrates a plan view of an embodiment of an electronic device having a lever in the rear portion of a tray, the lever configured to release the tray.

FIG. 3 illustrates a plan view of an embodiment of electronic device 100 having arm 120 in rear portion 122 of tray 110, with arm 120 that combines with other features to define an ejector apparatus configured to release or at least eject a portion of tray 110. In some embodiments, arm 120 is a lever that rotates (or pivots) about fulcrum 124. As shown, tray 110 may be referred to as being in an inserted position, or first position. In this position, information stored on integrated circuit 112 may be transmitted to and from device 100. As shown, arm 120 is positioned around fulcrum 124. Also, spring member 126 may engaged with rear portion 122 of tray 110, and also proximate to contact 128. As shown in FIG. 3, spring member 126 and contact 128, both of which are made from electrically conductive materials (e.g., metal), may form a switch that is part of an electrical circuit. As shown in FIG. 3, spring member 126 and contact 128 define an open switch configuration that does not allow electrical current to flow through spring member 126 and contact 128. Also, aperture 114 located in front portion 116 of tray 110 may be configured to receive tool 130. In some embodiments, tool 130 is a cylindrical member. Also, device 100 may provide a path such that tool 130 may extend to rear portion 122 of tray 110.

In some embodiments, arm 120, fulcrum 124, spring member 126, and contact 128 include a dimension (e.g., z-direction shown in FIG. 2) less than that of tray 110. In this manner, device 100 may include a thickness dependent on the dimension of tray 110 and not on the aforementioned components.

Figure 4:
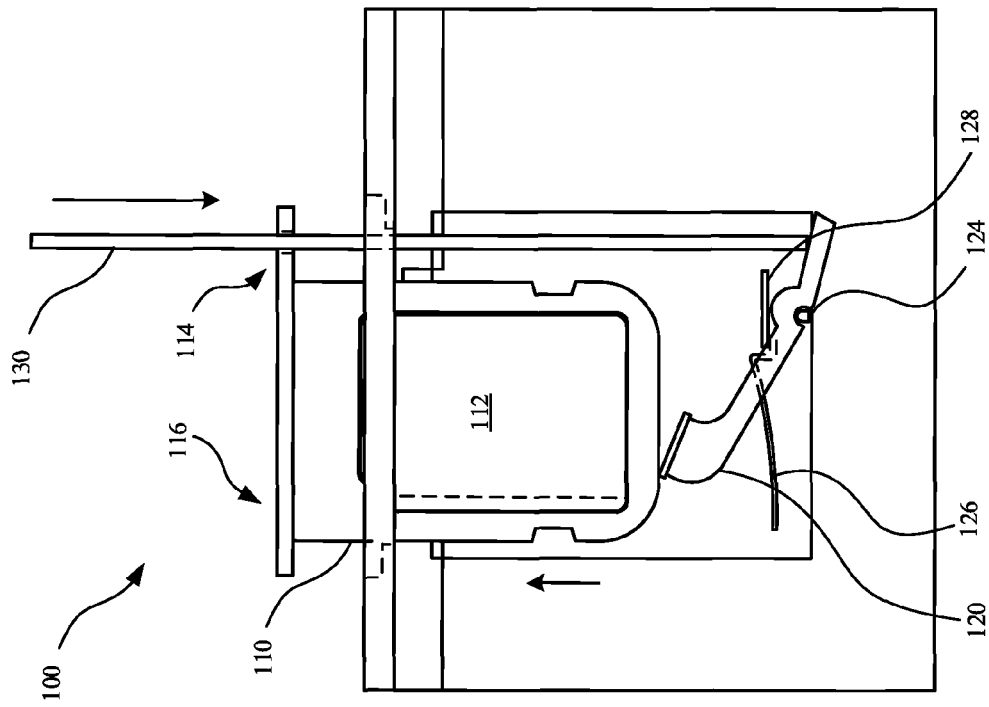
FIG. 4 illustrates a plan view of the embodiment shown in FIG. 3, showing a tool actuating the lever to release the tray.

FIG. 4 illustrates a plan view of the embodiment shown in FIG. 3, showing tool 130 actuating arm 120 to release tray 110. When tool 130 is inserted through aperture 114, tool 130 may apply a force to arm 120, causing arm 120 to rotate (or pivot) about fulcrum 124. As a result, arm 120 may exert an ejection force on tray 110 causing tray 110 to at least partially eject from device 100 such that a user may remove tray 110 (and or integrated circuit 112) from device 100. However, in some cases, a force from tool 130 may be capable of fully ejecting tray 110. Also, when tray 110 is ejected in the manner shown in FIG. 4, tray 110 may be referred to as being in a second position, an ejected position, in which integrated circuit 112 can no longer transmit information to device 100. Also, in this position, spring member 126 may engage contact 128, thereby placing the switch in a closed switch configuration and completing the electrical circuit. As a result, an electrical signal may be sent to a processor (not shown) of device 100 indicating tray 110 is in the ejected position.

FIG. 5 illustrates a plan view of an embodiment of an electronic device 200, or simply device 200, having arm mechanism 220 configured to release tray 210. In some embodiments, arm mechanism 220 includes first arm 221 and second arm 222, both of which may rotate (or pivot) about fulcrum 224. As shown, arm mechanism 220 may be located proximate to front portion 216 of tray 210. Also, arm mechanism 220 may be configured to rotate clockwise or counterclockwise about fulcrum 224. As shown, tray 210 and integrated circuit 212 are in a first position, with a body portion of tray 210 carrying integrated circuit 212. In some embodiments, tool 230 may be positioned through aperture 214 of tray 210. In the embodiment shown in FIG. 5, aperture 214 is formed in an enclosure of device 200, and in particular, aperture 214 is formed within sidewall 208. In this manner, tray 210 does not include any apertures for receiving a tool. This may reduce debris or other contaminants from ingress which decreases the probability of integrated circuit 212 becoming damaged. However, in other embodiments, aperture 214 is located in front portion 216 of tray 210. Also, device 200 may include spring member 226 and contact 228 capable of completing an electrical switch. As shown, spring member 226 and contact 228 define an open configuration.

As shown, first arm 221 is proximate to aperture 214 and accordingly, may receive a force. This force may cause both first arm 221 and second arm 222 to rotate in a clockwise configuration, causing second arm 222 to engage front portion 216 to eject at least a portion of tray 210 from electronic device 200. Also, first arm 221 separated from second arm 222 by angle by angle 250. In some embodiments, angle 250 is an obtuse angle but also less than 180 degrees.

FIG. 6 illustrates a plan view of the embodiment shown in FIG. 5, showing tool 230 extending through aperture 214, and actuating arm mechanism 220 to release the tray 210. As shown, tool 230 may exert a force on arm mechanism 220, and in particular first arm 221, causing arm mechanism 220 to rotate about fulcrum 224 in a clockwise direction. As a result, second arm 222 causes an ejection force on tray 210 actuating tray 210 (in particular, front portion 216 and flange portion 218) to at least partially eject tray 210 from device 200. In FIG. 6, front portion 216 is actuated from electronic device 200 such that front portion 216 is exterior with respect to sidewall 208.

Figure 8:
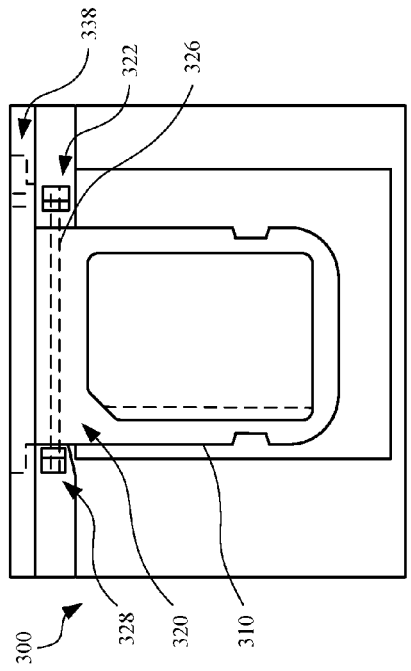
FIG. 8 illustrates a plan view of the embodiment shown in FIG. 7.
Figure 7:
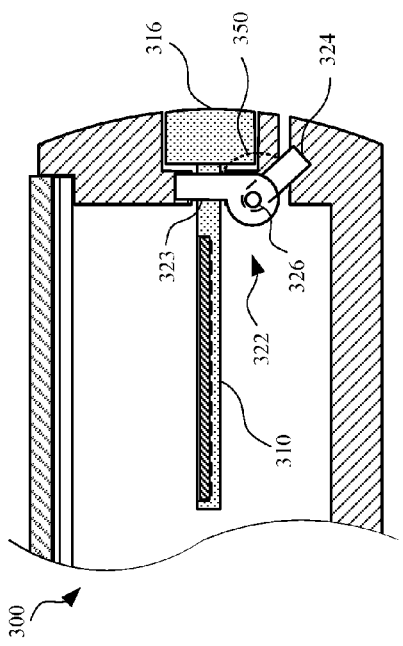
FIG. 7 illustrates a cross sectional view an embodiment of an electronic device having an alternative embodiment of a pivot mechanism.

FIG. 7 illustrates a cross sectional view an embodiment of an electronic device 300, or simply device 300, having an alternative embodiment of a pivot mechanism that combines with other features to define an ejector apparatus configured to release or at least eject a portion of tray 310. As shown, the pivot mechanism is positioned proximate to front portion 316 of tray 310, with a body portion of tray 310 connected to front portion 316 and configured to carry an integrated circuit (not shown). In some embodiments, the pivot mechanism may include first pivot mechanism 322 secured to axle 326. As shown, first pivot mechanism 322 includes first arm 323 and second arm 324 separated by angle 350. Angle 350 may be an obtuse angle but less than 180 degrees. In addition, in this embodiment, as shown in FIG. 8, the pivot mechanism includes first pivot mechanism 322 and second pivot mechanism 328. Second pivot mechanism 328 may include a first arm and a second arm (not shown) similar to that of first pivot mechanism 322. Both first pivot mechanism 322 and second pivot mechanism 328 are secured to axle 326 extending along tray 310. Second pivot mechanism 328 may be substantially similar to first pivot mechanism 322. However, in some embodiments, second pivot mechanism 328 is smaller than first pivot mechanism 322, or vice versa. First pivot mechanism 322 and second pivot mechanism 328 may be positioned on both sides of tray 310 to provide a force to multiple locations of tray 310. In this manner, tray 310 may be ejected evenly from device 300. In other words, tray 310 is not ejected in an uneven or crooked manner that may lodge tray 310 within device 300 in an undesired manner. Also, first pivot mechanism 322 and second pivot mechanism 328 may both be configured to rotate in clockwise and counterclockwise directions. Accordingly, first pivot mechanism 322, axle 326, and second pivot mechanism 328 combine to define the ejector apparatus.

Figure 10:
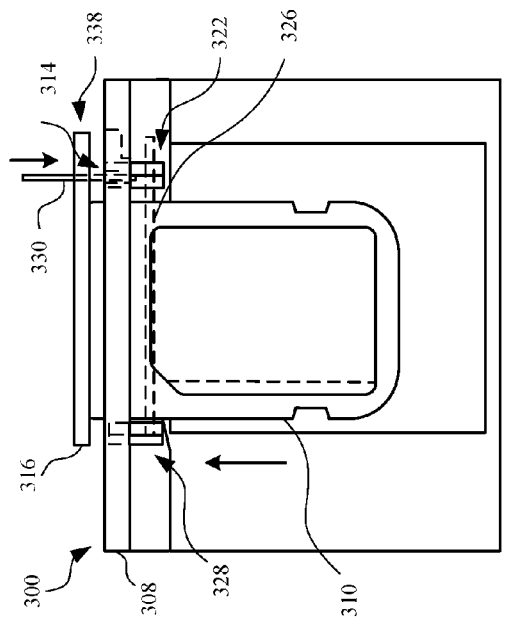
FIG. 10 illustrates a plan view of the embodiment shown in FIG. 9.
Figure 9:
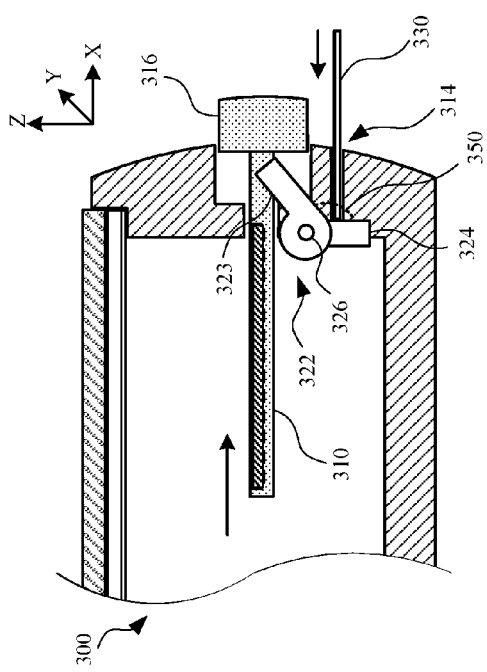
FIG. 9 illustrates a cross sectional view the embodiment shown in FIG. 7, with a tool inserted into the electronic device to actuate the pivot mechanism to release the tray.

FIG. 9 illustrates a cross sectional view the embodiment shown in FIG. 7, with tool 330 inserted into electronic device 300 to actuate first pivot mechanism 322 to release the tray 310. In some embodiments, aperture 314 is located within tray 310. In the embodiment shown in FIG. 9, device 300 includes aperture 314 below tray 310 (in a z-direction). When tool 330 extends through aperture 314, tool 330 may engage first pivot mechanism 322 and rotate first pivot mechanism 322 about axle 324. Axle 324 may provide rotational, or torsional, force on second pivot mechanism 326 such that both first pivot mechanism 322 and second pivot mechanism 326 act in concert to exert a force capable of at least partially ejecting tray 310, as shown in FIG. 10. For example, in FIG. 10, front portion 316, which may include flange portion 338, is actuated from electronic device 300 such that front portion 316 is exterior with respect to sidewall 308. In other embodiments, aperture 314 is located in device 300 such that tool 330 engages second pivot mechanism 326 and provides a force via axle 324 to first pivot mechanism 322.

Figure 11:
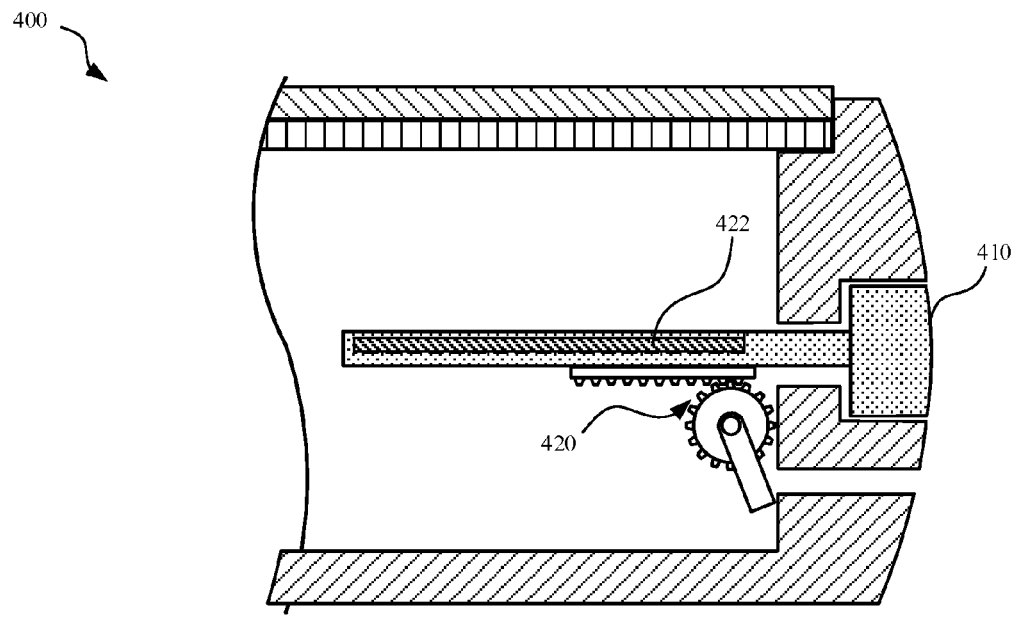
FIG. 11 illustrates a cross sectional view of an embodiment of an electronic device having a gear mechanism configured to release a tray.
Figure 12:
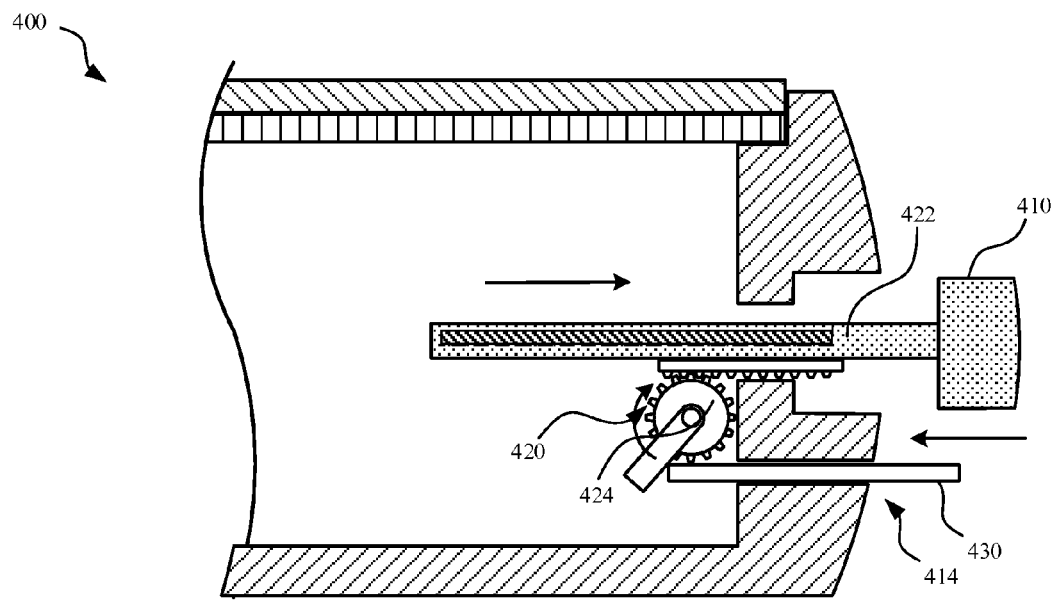
FIG. 12 illustrates a plan view of the embodiment shown in FIG. 11, showing a tool actuating the gear mechanism to release the tray.

FIG. 11 illustrates a cross sectional view of an embodiment of electronic device 400, or simply device 400, having gear mechanism 420 configured to release tray 410. Gear mechanism 420 may be configured to rotate in either a clockwise or counterclockwise configuration. Tray 410 may include rack 422 in a geared relationship with gear mechanism 420. As shown in FIG. 12, when tool 430 extends through aperture 414 of device 400, tool 430 may actuate gear mechanism 420 in a clockwise direction. As a result, gear mechanism 420 may actuate tray 410 via rack 422 and at least partially eject tray 410. In some embodiments (not shown), a second gear mechanism may be also be used. The second gear mechanism can be placed in a location similar to that of second pivot mechanism 326 (shown in FIG. 8). In other words, a pair of gear mechanism may be located at opposite ends of tray 410. In this manner, gear mechanism 420 may also rotate axle 424 which causes rotational, or torsional force, on the second gear mechanism.

Figure 13:
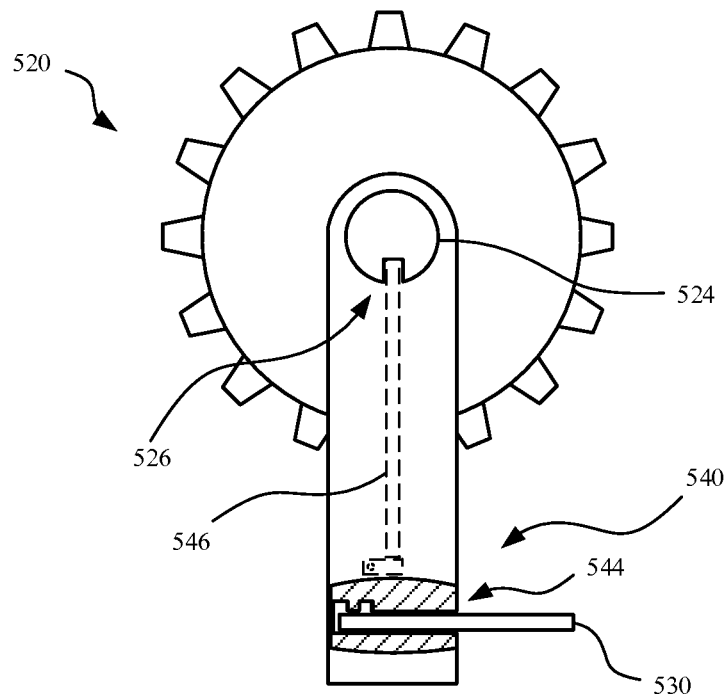
FIG. 13 illustrates a side view of an embodiment of a gear mechanism, and further showing a partial cross sectional view of the gear mechanism having a key feature.

In some embodiments, an electronic device may further include a mechanism configured to remove a tray in a manner previously described, and in addition include a secured means for ejecting the tray. For example, FIG. 13 illustrates a side view of an embodiment of a gear mechanism 520, and further showing a partial cross sectional view of gear mechanism 520 having lock feature 540. Lock feature 540 may include aperture 544 configured to receive a tool. However, in order to actuate gear mechanism 520, which may be used in an electronic device to eject a tray in a manner previously described, the tool must having a mated key feature. In other words, the tool must act as a key that can be authenticated by lock feature 540 before gear mechanism 520 can be actuated, and accordingly, before a tray can be ejected. As shown in FIG. 13, when a tool (such as tool 530) inserted into aperture 544 not intended for use with gear mechanism 520, lock feature 540 does not allow gear mechanism 520 to rotate. In some embodiments, lock feature 540 include column 546 engaged with an opening 526 of axle 524 which prevents axle 524 and gear mechanism 520 from rotation.

Figure 14:
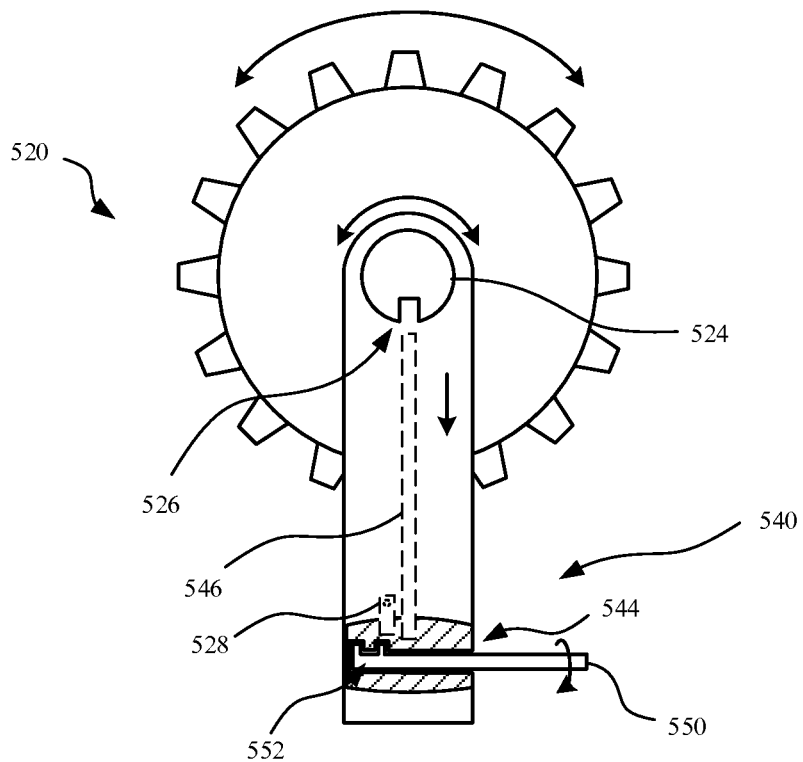
FIG. 14 illustrates a side view of the embodiment of the gear mechanism shown in FIG. 13, further showing the tool having a key feature that mates with the key feature of the gear mechanism.

FIG. 14 illustrates a side view of the embodiment of gear mechanism 520 shown in FIG. 13, further showing tool 550 having a mating key feature 552 that mates with lock feature 540 of the gear mechanism 520. As a result, lock feature 540 of gear mechanism 520 includes release mechanism 528 configured to release column 546 from opening 526 in axle 524. Accordingly, gear mechanism 520 may then rotate in a desired direction. Also, FIGS. 13 and 14 illustrate mechanical means for "unlocking" gear mechanism 520, other method may be used. For example, lock feature 540 may require means such as an authentication chip on tool 550 such that when tool 550 is inserted into aperture 544, lock feature 540 unlocks gear mechanism 520 for movement. Alternatively, lock feature 540 may require a certain magnetic polarity or a specific configuration of magnetic polarities in order to unlock gear mechanism 520. In that case, tool 550 may include the requisite magnetic polarity or polarities.

Figure 15:
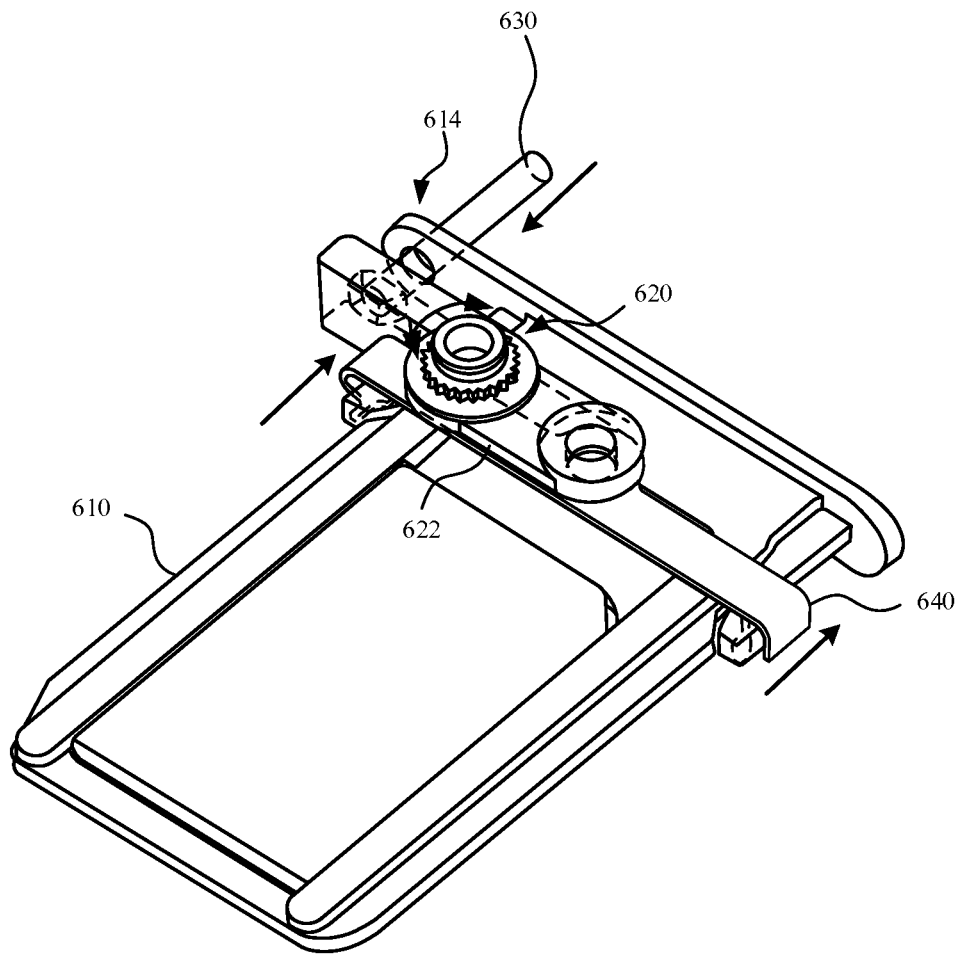
FIG. 15 illustrates a bottom isometric view of an embodiment of a tray having a gear mechanism.

FIG. 15 illustrates a bottom isometric view of an embodiment of tray 610 having an alternate embodiment of gear mechanism 620. In this case, tool 630 may be inserted through aperture 614 of tray 610 to engage lever 622. Tool 630 may actuate gear mechanism 620 via lever 622, which may actuate rack 640 while also rotating gear mechanism 620 about a cylinder (not shown) positioned within gear mechanism 620. The rotational movement of gear mechanism 620 along with rack 640 may actuate tray 610 in a manner that at least partially ejects tray 610 from an electronic device (not shown). Alternatively, or in combination, gear mechanism 620 may be engaged with another gear mechanism (not shown) to provide additional rotational movement thereby ejecting tray 610.

Figure 16:
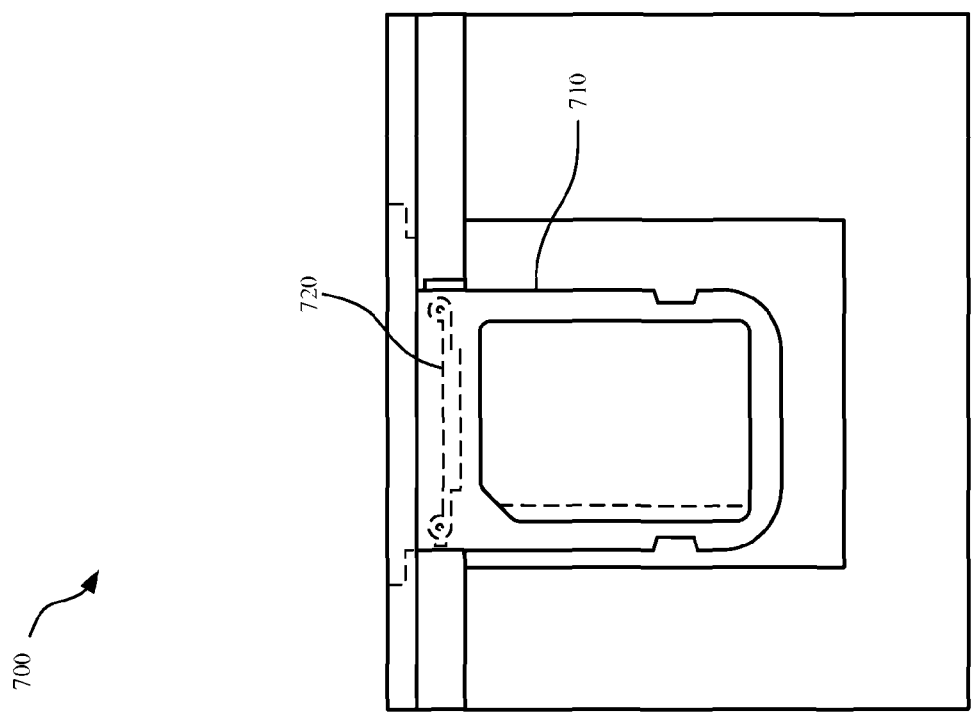
FIG. 16 illustrates a plan view of an embodiment of an electronic device having a spring mechanism configured to release a tray.

FIG. 16 illustrates a plan view of an embodiment of electronic device 700, or simply device 700, having spring mechanism 720 configured to release tray 710. In some embodiments, spring mechanism 720 is a leaf spring. As shown in FIG. 16, spring mechanism 720 is in a relatively high potential energy state and may be configure to release tray 710 when a force is applied to spring mechanism 720.

Figure 17:
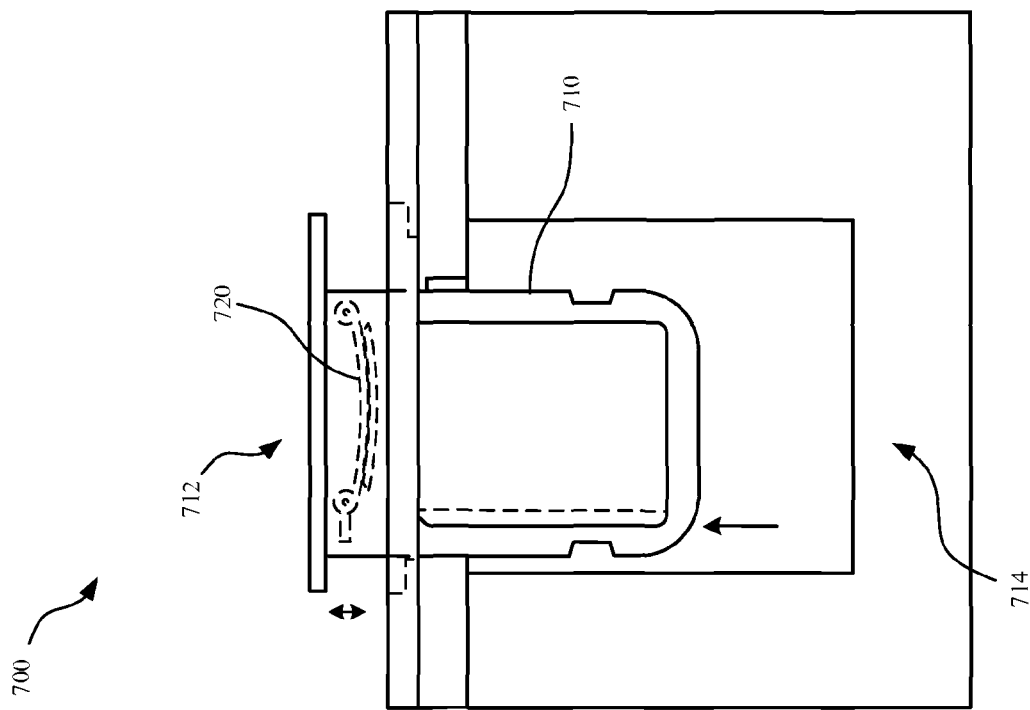
FIG. 17 illustrates a plan view of the embodiment shown in FIG. 16, showing the tray being released using the spring mechanism.

FIG. 17 illustrates a plan view of the embodiment of device 700 shown in FIG. 16, showing tray 710 being released using spring mechanism 720. In some embodiments (not shown), a tool may extend through an aperture of device 700 or the tray to release tension on spring mechanism 720 thereby actuating tray 710 to eject from device 700. In the embodiment shown in FIG. 17, a force may be applied to front portion 712 in a direction toward central portion 714 of device 700. This force cause spring mechanism 720 causes spring mechanism 720 to release from the high potential energy state and actuate tray 710 away from central portion 714, thereby at least partially ejecting tray 710 from device 700.

While various features are not shown in combination with other features, several features may be combined with other features. For example, embodiments of the spring member 126 and contact 128 (e.g., in FIG. 3) may be used in any embodiment of an electronic device presented. Further, embodiments of lock feature 540 as well as tool 550 having a mating key feature 552 (e.g., in FIGS. 13 and 14) may be used in any embodiment of an electronic device presented. Also, embodiments of spring mechanism 720 (e.g., in FIGS. 16 and 17) may be used in any embodiment of an electronic device presented.

Figure 18:
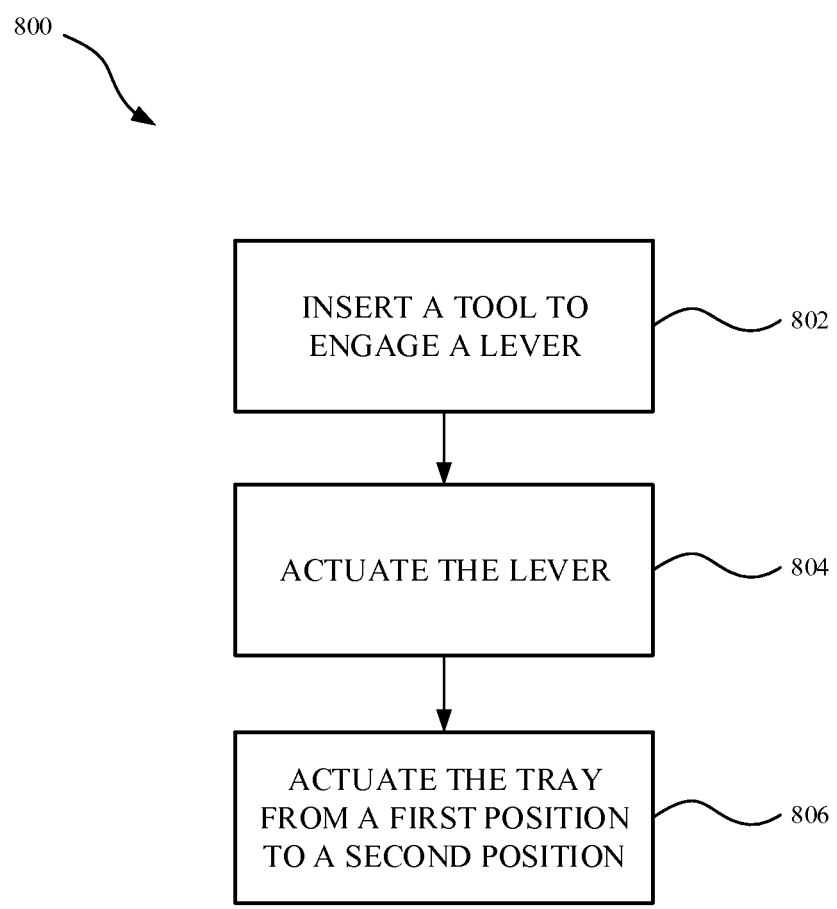
FIG. 18 illustrates a method for ejecting a tray from an electronic device.

FIG. 18 illustrates a flowchart 800 showing a method for ejecting a tray from an electronic device. In step 802, a tool is inserted into the electronic device to engage a lever. In some embodiments, the tool is inserted into the electronic device beyond a rear portion of the tray. In step 804, the lever is actuated. In some embodiments, the lever is actuated to pivot about a fulcrum.

In step 806, the tray is actuated from a first position to a second position. In some embodiments, actuating the tray causes a switch to close an electrical contact in the electronic device. In this manner, closing the electrical contact corresponds to the tray being in the second position. In some embodiments, the electronic device includes a lock feature that requires a key with a mating feature to unlock the lock feature in order to actuate the lever.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An ejector apparatus suitable for use in an electronic device for ejecting a subscriber identity module ("SIM") tray from the electronic device, the SIM tray comprising a body portion configured to carry a SIM card and a front portion having a flange portion that extends laterally beyond the body portion, the flange portion co-planar with respect to a sidewall of the electronic device in an inserted state, the ejector apparatus comprising:

a fulcrum located in the electronic device; and an arm mechanism located in the electronic device and rotatably coupled with the fulcrum, wherein the arm mechanism rotates about the fulcrum in response to a force in a first direction provided through an opening in the sidewall, the opening external with respect to the flange portion, the force causing the arm mechanism to engage the flange portion and drive the flange portion from the sidewall in a second direction opposite the first direction, thereby causing the SIM tray to change from the inserted state to an ejected state defined by the flange portion being external with respect to the sidewall.

2. The ejector apparatus of claim 1, wherein the arm mechanism comprises:

a first arm; and a second arm pivotably coupled to the first arm at the fulcrum, wherein the first arm rotates about the fulcrum in response to the force causing the second arm to rotate about the fulcrum to engage the flange portion and eject the flange portion from the sidewall.

3. The ejector apparatus of claim 1, wherein the force is applied by a tool received through an aperture in the flange portion.

4. The ejector apparatus of claim 1, wherein the arm mechanism includes a first arm and a second arm pivotably coupled to the first arm at the fulcrum, and wherein the second arm is pivotably coupled to the first arm at the fulcrum at an angle less than 180 degrees, the angle measured from a surface of the first arm that faces a surface of the second arm.

5. The ejector apparatus of claim 4, wherein the angle is an obtuse angle.

6. An ejector apparatus suitable for use in an electronic device for ejecting a tray from the electronic device, the tray configured to carry a subscriber identify module ("SIM") card and having a flange portion, the ejector apparatus comprising:

a first pivot mechanism proximate to a first end of the flange portion;

a second pivot mechanism proximate to a second end of the flange portion, the second end opposite the first end; and an axle secured to the first pivot mechanism and the second pivot mechanism, wherein a rotation of the first pivot mechanism causes the axle to rotate, thereby causing the second pivot mechanism to rotate such that the first pivot mechanism and the second pivot mechanism engage the first end and the second end, respectively, of the flange portion.

7. The ejector apparatus of claim 6, further comprising an aperture that allows a tool to extend through the aperture to apply a force to the first pivot mechanism.

8. The ejector apparatus of claim 7, wherein the aperture is positioned in a sidewall of the electronic device.

9. The ejector apparatus of claim 8, wherein when the flange portion is ejected, the flange portion is external with respect to the sidewall.

10. The ejector apparatus of claim 6, wherein the first pivot mechanism comprises a first arm and a second arm.

11. The ejector apparatus of claim 10, wherein when the first arm is configured to receive a force that causes the second arm to engage the flange portion.

12. An electronic device, comprising: an enclosure having a sidewall that includes an opening;

a subscriber identity module ("SIM") tray comprising:

a body portion configured to carry a SIM card, and a front portion having a flange portion extending laterally beyond the front portion, the front portion co-planar with respect to the sidewall in an inserted state;

an ejector apparatus for ejecting the SIM tray, the ejector apparatus comprising: an arm mechanism located within the enclosure, wherein the arm mechanism rotates about a fulcrum in response to a force in a first direction provided through the opening, the opening external with respect to the flange portion, the force causing the arm mechanism to engage the flange portion and drive the flange portion from the sidewall in a second direction opposite the first direction, thereby causing the SIM tray to change from the inserted state to an ejected state defined by the flange portion being external with respect to the sidewall.

13. The electronic device of claim 12, wherein the arm mechanism comprises a first arm and a second arm pivotably coupled to the first arm.

14. The electronic device of claim 13, wherein the opening is positioned such that a tool is inserted into the opening to provide a force to the first arm.

15. The electronic device of claim 14, wherein the second arm, in response to the force to the first arm, engages the front portion to eject the SIM tray.

16. The electronic device of claim 15, further comprising:

a spring member in contact with the SIM tray when the SIM tray positioned in the electronic device and the front portion is co-planar with respect to the sidewall; and a contact, wherein when the front portion is ejected, the SIM tray disengages from the spring member causing the spring member to engage the contact to define a closed switch configuration in the electronic device that generates an electrical signal to notify the electronic device the front portion is ejected.

17. The electronic device of claim 16, wherein the SIM tray is a tray suitable for carrying a subscriber identity module (SIM) card.

18. The electronic device of claim 12, wherein the front portion is free of apertures.

* * * * *